(12) United States Patent
Gou et al.

(10) Patent No.: US 10,944,519 B2
(45) Date of Patent: Mar. 9, 2021

(54) METHOD AND APPARATUS FOR TRANSMITTING AND RECEIVING A SYNCHRONIZATION SIGNAL AND TRANSMISSION SYSTEM

(71) Applicant: ZTE Corporation, Shenzhen, Guangdong (CN)

(72) Inventors: Wei Gou, Guangdong (CN); Feng Bi, Guangdong (CN); Peng Hao, Guangdong (CN); Junfeng Zhang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/252,525

(22) Filed: Jan. 18, 2019

(65) Prior Publication Data
US 2019/0327041 A1    Oct. 24, 2019

Related U.S. Application Data

(63) Continuation of application No. PCT/CN2017/092830, filed on Jul. 13, 2017.

(30) Foreign Application Priority Data

Jul. 18, 2016 (CN) .......................... 201610567483.2

(51) Int. Cl.
*H04L 5/00* (2006.01)
*H04L 27/26* (2006.01)

(52) U.S. Cl.
CPC ........ *H04L 5/0007* (2013.01); *H04L 27/2601* (2013.01)

(58) Field of Classification Search
CPC .......................... H04L 5/0007; H04L 27/2601
See application file for complete search history.

(56) References Cited

U.S. PATENT DOCUMENTS

| 2010/0041355 A1* | 2/2010 | Laroia ...................... H01Q 3/24 455/129 |
| 2010/0054233 A1 | 3/2010 | Park et al. |
| 2015/0016337 A1* | 1/2015 | Chung .............. H04W 56/0085 370/328 |

(Continued)

FOREIGN PATENT DOCUMENTS

| CN | 102299892 A | 12/2011 |
| CN | 102739594 A | 10/2012 |

(Continued)

OTHER PUBLICATIONS

International Search Report and Written Opinion dated Sep. 26, 2017 for International Application No. PCT/CN2017/092830, filed on Jul. 13, 2017 (12 pages).

(Continued)

*Primary Examiner* — Kabir A Timory
(74) *Attorney, Agent, or Firm* — Perkins Coie LLP (57) ABSTRACT

Disclosed is a method and apparatus for transmitting and receiving a synchronization signal and a transmission system. In the method, a transmitting node determines a frequency band range in which a carrier is located, and configures or assumes synchronization channel information on the carrier according to the frequency band range, where the synchronization channel information includes at least one of: a subcarrier spacing or orthogonal frequency division multiplexing (OFDM) symbol information of a synchronization channel; and the transmitting node transmits the synchronization signal using the synchronization channel information.

14 Claims, 2 Drawing Sheets

Determine, by a transmitting node, a frequency band range in which a carrier is located, and configure or assume, on the carrier, a subcarrier spacing and/or OFDM symbol information of a synchronization channel according to the frequency band range — S102

Transmit, by the transmitting node, the synchronization signal using the subcarrier spacing and/or the OFDM symbol information — S104

(56) References Cited

U.S. PATENT DOCUMENTS

2018/0270844 A1 9/2018 Kim et al.
2018/0376436 A1* 12/2018 Wolff .................. H04L 27/26

FOREIGN PATENT DOCUMENTS

CN  105099642 A  11/2015
JP  2013-187833 A  9/2013

OTHER PUBLICATIONS

3GPP, Chairman, "Draft Agenda," TSG RAN WG1 Meeting #84bis, Busan, Korea, R1-162141, 8 pages, Apr. 2016.
3GPP, Qualcomm Incorporated, ZTE, "15KHz and 175 KHz Based Numerology Comparison," TSG RAN WG1 Meeting #84bis, Busan, Korea, R1-163620, 7 pages, Apr. 2016.
3GPP, Qualcomm Incorporated, ZTE, Oppo, Etri, "WF on Numerology Comparison," TSG RAN WG1 Meeting #84bis, Busan, Korea, R1-163715, 6 pages, Apr. 2016.
3GPP, Spreadtrum Communications, "Discussion on numerology sets," TSG RAN WG1 meeting #85, Nanjing, China, R1-164590, 6 pages, May 2016.
3GPP, ZTE, Qualcomm Incorporated, "Alternative options to a achieve $2^{\wedge}n$ symbols per 1 ms numerology," TSG RAN WG1 Meeting #84bis, Busan, Korea, R1-163864, 5 pages, Apr. 2016.
Chinese Office Action dated Jun. 4, 2020 for Chinese Patent Application No. 201610567483.2, filed Jul. 18, 2016 (17 pages).
Extended Search Report dated May 25, 2020 for European Application No. 17830415.0, filed Jul. 13, 2017 (10 pages).
LG Electronics, "DRS design in LAA", 3GPP TSG RAN WG1 meeting #82bis, Malmo, Sweden, R1-155387, 11 pages, Oct. 2015.
Samsung, "Cell search for NR: design consideration", 3GPP TSG RAN WG1 #85, Nanjing, China, R1-163997, 6 pages, May 2016.

* cited by examiner

METHOD AND APPARATUS FOR TRANSMITTING AND RECEIVING A SYNCHRONIZATION SIGNAL AND TRANSMISSION SYSTEM

CROSS REFERENCE TO RELATED APPLICATIONS

This patent document is a continuation of and claims priority to International Patent Application No. PCT/CN2017/092830, filed on Jul. 13, 2017, which claims the benefit of priority of Chinese Patent Application No. 201610567483.2, filed on Jul. 18, 2016. The entire contents of the before-mentioned patent applications are incorporated by reference as part of the disclosure of this application.

TECHNICAL FIELD

The application relates to, but is not limited to, the field of communications, and in particular, relates to a method and apparatus for transmitting and receiving a synchronization signal and a transmission system.

BACKGROUND

With continuous advance in radio technologies, various radio services emerge. However, frequency spectrum resources on which the radio services are based are limited. To confront with increasing demands for bandwidth by people, the frequency spectrum resources of 300 MHz to 3 GHz mainly used by the traditional commercial communications are extremely in short supply and cannot meet the demands of future wireless communications.

In a new generation mobile communication system, new radio (NR), system networking is to be implemented with a carrier frequency higher than a carrier frequency used in 2G, 3G and 4G systems. Currently, frequency bands widely recognized by the industry and international organizations are mainly 3 GHz to 6 GHz and 6 GHz to 100 GHz. These frequency bands substantially belong to the centimeter wave band and the millimeter wave band. Studies show that the phase noise of a radio frequency (RF) device is quite high at a frequency between 6 GHz and 100 GHz, especially at a higher frequency. Such phase noise may be resisted with an increase in the subcarrier width of the orthogonal frequency division multiple access system. The high frequency is significantly different from the lower frequency bands in propagation characteristic. Since the propagation loss in the high frequency band is significantly larger than the propagation loss in the low frequency band, the coverage area of the high frequency band is generally much smaller than the coverage area of the low frequency band. A smaller coverage area generally goes with a smaller delay spread of the channel, and the corresponding coherence bandwidth is larger than the coherent bandwidth in the low frequency band range of 300 M to 3000 M. The increased subcarrier width with respect to the subcarrier width in the Long-Term Evolution (LTE) system may still satisfy the design requirement on the subcarrier spacing within the coherent bandwidth. Therefore, the subcarrier spacing (SCS) (equivalent to the subcarrier width) needs to be adjusted according to the carrier frequency, and the adjustment is feasible and reasonable.

The NR system covers the carrier frequency from 6 G up to 100 G. Basic frame structure parameters such as different subcarrier spacing values need to be used to adapt to the carrier frequency, that is, the frame structure design parameters at each carrier frequency are different. For example, the closer the frequency is to the core frequency of LTE, the closer the typical frame structure parameters such as subcarrier spacing are to the existing parameters of LTE. The higher the frequency is, the larger the subcarrier spacing is. The subcarrier spacing currently under study may be selected to be 15 kHz, 30 kHz, 60 kHz, 75 kHz, 120 kHz up to 240 kHz, or less than 15 kHz.

The frame structure parameters may be different at different frequencies in different systems. Moreover, even in NR systems at the same frequency, the subcarrier spacing parameters may also be different for different types of services. For example, the ultra reliable low latency communication (URLLC) service, which emphasizes low latency, has shorter symbols and larger subcarrier spacing than enhance mobile broadband (eMBB). In contrast, the massive machine type communication (mMTC), which has a service demand biased towards massive access and deep coverage, may have much smaller subcarrier spacing and much longer symbol than the eMBB service. Multiple types of services are multiplexed on the same carrier, making the frame structure parameters in a system more complicated.

SUMMARY

The following is a summary of the subject matter described herein in detail. This summary is not intended to limit the scope of the claims.

Compared with the LTE system, the NR system also needs a unique synchronization system for downlink access of the terminal.

Embodiments of the present invention provide a method and apparatus for transmitting a synchronization signal, a method and apparatus for receiving a synchronization signal and a transmission system of a synchronization signal, to improve the synchronization precision between the transmitting node and the receiving node.

An embodiment of the present invention provides a method for transmitting a synchronization signal. The method includes: determining, by a transmitting node, a frequency band range in which a carrier is located, and configuring or assuming synchronization channel information on the carrier according to the frequency band range, where the synchronization channel information includes at least one of: a subcarrier spacing or orthogonal frequency division multiplexing (OFDM) symbol information of a synchronization channel; and transmitting, by the transmitting node, the synchronization signal using the synchronization channel information.

In one implementation mode, the subcarrier spacing includes at least one of: 15 kHz, 30 kHz, 60 kHz, 120 kHz, or 240 kHz.

In one implementation mode, the OFDM symbol information includes a number of OFDM symbols, and the number of symbols includes at least one of: one, two, four, six, eight, or sixteen.

In one implementation mode, configuring or assuming the synchronization channel information on the carrier according to the frequency band range includes at least one of:

when the frequency band range is less than 6 GHz, configuring or assuming the subcarrier spacing of 15 kHz and two consecutive OFDM symbols for the synchronization channel on the carrier;

when the frequency band range is greater than 6 GHz, configuring or assuming the subcarrier spacing of 60 kHz and two or four consecutive OFDM symbols for the synchronization channel on the carrier;

when the frequency band range is between 6 GHz and 30 GHz, configuring or assuming the subcarrier spacing of 60 kHz and two or four consecutive OFDM symbols for the synchronization channel on the carrier;

when the frequency band range is greater than 30 GHz, configuring or assuming the subcarrier spacing of 120 kHz and two or four or eight consecutive OFDM symbols for the synchronization channel on the carrier; or when the frequency band range is greater than 6 GHz, configuring or assuming the subcarrier spacing of 120 kHz and two or four or eight consecutive OFDM symbols for the synchronization channel on the carrier.

In one implementation mode, when the transmitting node transmits the synchronization signal on the carrier according to the frequency range of less than 6 GHz and the subcarrier spacing of 15 kHz, the method further includes: transmitting, by the transmitting node, data other than the synchronization signal according to at least one subcarrier spacing of a group including: 15 kHz, 30 kHz, 60 kHz, 120 kHz, and 240 kHz.

In one implementation mode, configuring or assuming the synchronization channel information on the carrier according to the frequency band range includes: configuring or assuming, on the carrier, a subcarrier spacing of a frequency domain resource in an OFDM symbol on which the synchronization channel is located according to the frequency band range, where the subcarrier spacing is the same as or different from a subcarrier spacing of a frequency domain resource of a non-synchronization channel in the OFDM symbol on which the synchronization channel is located.

In one implementation mode, configuring the synchronization channel information on the carrier according to the frequency band range includes: when the frequency band range is greater than 6 GHz or less than 6 GHz, configuring two OFDM symbols for the synchronization channel on the carrier, where the two OFDM symbols include one primary synchronization sequence and one secondary synchronization sequence.

In one implementation mode, configuring or assuming the synchronization channel information on the carrier according to the frequency band range includes: when the frequency band range is greater than 6 GHz, configuring or assuming, on the carrier, an OFDM symbol of a primary synchronization sequence and an OFDM symbol of a secondary synchronization sequence for the synchronization channel, where the primary synchronization sequence includes at least one or two consecutive OFDM symbols, the secondary synchronization sequence includes at least two consecutive OFDM symbols, and the primary synchronization sequence and the secondary synchronization sequence are transmitted or retransmitted on respective OFDM symbols.

In one implementation mode, when the synchronization signal includes a primary synchronization signal and a secondary synchronization signal, transmitting, by the transmitting node, the synchronization signal using the synchronization channel information includes: transmitting, by the transmitting node, the primary synchronization signal through an omnidirectional antenna using the synchronization channel information; transmitting, by the transmitting node, the primary synchronization signal through a physical directional antenna using the synchronization channel information; and transmitting, by the transmitting node, the secondary synchronization signal using the synchronization channel information after the signal is precoded using a beam parameter; where the primary synchronization signal is configured to describe a base station and is transmitted and kept the same in each sector of the base station, and the secondary synchronization signal is configured to describe at least one of: a cell, a beam, or a beam group.

In one implementation mode, transmitting, by the transmitting node, the synchronization signal using the synchronization channel information includes: transmitting, by the transmitting node, a first-level synchronization signal in each sector subordinate to a base station with an omnidirectional antenna using the synchronization channel information, where the all sectors subordinate to the base station are the same; transmitting, by the transmitting node, a second-level synchronization signal in the each sector subordinate to the base station using the synchronization channel information, where the sectors subordinate to the base station are different from each other; and transmitting, by the transmitting node, a third-level synchronization signal in the sectors subordinate to the base station in different directions of beams or beam groups using the synchronization channel information; where the first-level synchronization signal is configured to describe the base station, the second-level synchronization signal is configured to describe the sectors subordinate to the base station, and the third-level synchronization signal is configured to describe the beams or beam groups.

In one implementation mode, transmitting, by the transmitting node, the synchronization signal using the synchronization channel information includes: when a bandwidth of the carrier is less than 20 M, transmitting, by the transmitting node, a group of synchronization signals using the synchronization channel information; and when the bandwidth of the carrier is greater than or equal to 40 M, transmitting, by the transmitting node, a plurality of groups of synchronization signals discretely in a frequency domain using the synchronization channel information.

In one implementation mode, transmitting, by the transmitting node, the synchronization signal using the synchronization channel information includes: determining, by the transmitting node, a number S of groups of the synchronization signal by using a following formula: $S=\lfloor M/K \rfloor$, where $\lfloor \ \rfloor$ represents rounding down, M is a bandwidth of the carrier, and K is a bandwidth corresponding to one group of synchronization signals, and the bandwidth corresponding to the one group of synchronization signals is 20 MHz or 40 MHz; and transmitting, by the transmitting node, the S groups of synchronization signals according to the spacing bandwidth K.

In one implementation mode, each group of the S groups of synchronization signals includes a same first-level synchronization signal and a same or different second-level synchronization signal, where different second-level synchronization signals are same in sequence while different in a frequency domain and are transmitted by using different beam parameters; where the first-level synchronization signal is configured to describe the base station, the second-level synchronization signal is configured to describe at least one of: a sector, a beam or a beam group.

In one implementation mode, transmitting, by the transmitting node, the synchronization signal using the synchronization channel information includes: transmitting, by the transmitting node, one first-level synchronization signal and a plurality of second-level synchronization signals in a frequency domain of the carrier.

In one implementation mode, transmitting, by the transmitting node, the synchronization signal using the synchronization channel information includes: transmitting, by the transmitting node, the first-level synchronization signal on one OFDM symbol, and transmitting the second-level synchronization signal on a plurality of OFDM symbols, where the plurality of OFDM symbols are consecutive or equally spaced, and each of the plurality of OFDM symbols for transmitting the second-level synchronization signal uses a preset beam parameter.

In one implementation mode, a subcarrier spacing used for transmitting the first-level synchronization signal is different from a subcarrier spacing used for transmitting the second-level synchronization signal.

In one implementation mode, when the subcarrier spacing of the frequency domain resource of the synchronization channel is different from the subcarrier spacing of the frequency domain resource of the non-synchronization channel in the OFDM symbol on which the synchronization channel is located, the subcarrier spacing of the frequency domain resource of the synchronization channel is less than the subcarrier spacing of the frequency domain resource of the non-synchronization channel.

In one implementation mode, transmitting, by the transmitting node, the S groups of synchronization signals according to the spacing bandwidth K includes: configuring and transmitting the one group of synchronization signals in a central resource located in each bandwidth K for the carrier from a low-frequency end to a high-frequency end or from the high-frequency end to the low-frequency end.

An embodiment of the present invention provides a method for receiving a synchronization signal. The method includes: determining, by a receiving node, a frequency band range of a carrier; determining, by the receiving node, synchronization channel information according to the frequency band range, where the synchronization channel information includes at least one of: a subcarrier spacing or orthogonal frequency division multiplexing (OFDM) symbol information of a synchronization channel; and receiving, by the receiving node, the synchronization signal on the carrier using the synchronization channel information.

In one implementation mode, the subcarrier spacing includes one of: 15 kHz, 30 kHz, 60 kHz, 120 kHz, or 240 kHz.

In one implementation mode, the OFDM symbol information includes a number of OFDM symbols, and the number of symbols includes one of: one, two, four, six, eight, or sixteen.

In one implementation mode, the determining, by the receiving node, the synchronization channel information according to the frequency band range includes one of:

when the frequency band range is less than 6 GHz, determining the subcarrier spacing of 15 kHz and two consecutive OFDM symbols; or when the frequency band range is greater than 6 GHz, determining the subcarrier spacing of 60 kHz and two or four consecutive OFDM symbols.

In one implementation mode, receiving, by the receiving node, the synchronization signal on the carrier using the synchronization channel information includes:

when the frequency range is less than 6 GHz, receiving, by the receiving node, the synchronization signal on the carrier according to the subcarrier spacing of 15 kHz, where the method further includes: transmitting, by the receiving node, data other than the synchronization signal according to at least one subcarrier spacing of a group including: 15 kHz, 30 kHz, 60 kHz, 120 kHz, and 240 kHz.

In one implementation mode, when the synchronization channel information includes the subcarrier spacing, receiving, by the receiving node, the synchronization signal on the carrier using the synchronization channel information includes: receiving, by the receiving node, the synchronization signal on a frequency domain resource according to the subcarrier spacing. In one implementation mode, when the synchronization channel information includes the OFDM symbol information, determining, by the receiving node, the synchronization channel information according to the frequency band range includes: when the frequency band range is less than 6 GHz, determining, by the receiving node, two OFDM symbols occupied by the synchronization signal, where one OFDM symbol is a primary synchronization sequence and an other OFDM symbol is a secondary synchronization sequence.

In one implementation mode, when the synchronization channel information includes the OFDM symbol information, determining, by the receiving node, the synchronization channel information according to the frequency band range includes: when the frequency band range is greater than 6 GHz, determining, by the receiving node, an OFDM symbol of a primary synchronization sequence and an OFDM symbol of a secondary synchronization sequence for the synchronization channel, where the primary synchronization sequence includes at least one or two consecutive OFDM symbols, the secondary synchronization sequence includes at least two consecutive OFDM symbols, and the primary synchronization sequence and the secondary synchronization sequence are transmitted or retransmitted on respective OFDM symbols.

Another embodiment of the present invention provides an apparatus for transmitting a synchronization signal. The apparatus includes: a configuration module, which is configured to determine a frequency band range in which a carrier is located, and configure or assume synchronization channel information on the carrier according to the frequency band range, where the synchronization channel information includes at least one of: a subcarrier spacing or orthogonal frequency division multiplexing (OFDM) symbol information of a synchronization channel; and a transmitting module, which is configured to transmit the synchronization signal using the synchronization channel information.

In one implementation mode, the subcarrier spacing includes at least one of: 15 kHz, 30 kHz, 60 kHz, 120 kHz, or 260 kHz.

In one implementation mode, the OFDM symbol information includes a number of OFDM symbols, and the number of symbols includes at least one of: one, two, four, six, eight, or sixteen.

In one implementation mode, the configuration module includes at least one unit of a group including:

a first configuration unit, which is configured to configure or assume the subcarrier spacing of 15 kHz and two consecutive OFDM symbols for the synchronization channel on the carrier when the frequency band range is less than 6 GHz;

a second configuration unit, which is configured to configure or assume the subcarrier spacing of 60 kHz and two or four consecutive OFDM symbols for the synchronization channel on the carrier when the frequency band range is greater than 6 GHz;

a third configuration unit, which is configured to configure or assume the subcarrier spacing of 60 kHz and two or four consecutive OFDM symbols for the synchronization channel on the carrier when the frequency band range is between 6 GHz and 30 GHz;

a fourth configuration unit, which is configured to configure or assume the subcarrier spacing of 120 kHz and two or four or eight consecutive OFDM symbols for the synchronization channel on the carrier when the frequency band range is greater than 30 GHz; and a fifth configuration unit, which is configured to configure or assume the subcarrier spacing of 120 kHz and two or four or eight consecutive OFDM symbols for the synchronization channel on the carrier when the frequency band range is greater than 6 GHz.

Another embodiment of the present invention provides an apparatus for receiving a synchronization signal. The apparatus includes: a first determination module, which is configured to determine a frequency band range of a carrier; a second determination module, which is configured to determine synchronization channel information according to the frequency band range, where the synchronization channel information includes at least one of: a subcarrier spacing or orthogonal frequency division multiplexing (OFDM) symbol information of a synchronization channel; and a receiving module, which is configured to receive the synchronization signal on the carrier using the synchronization channel information.

In one implementation mode, the subcarrier spacing includes one of: 15 kHz, 30 kHz, 60 kHz, 120 kHz, or 240 kHz.

In one implementation mode, the OFDM symbol information includes a number of OFDM symbols, and the number of symbols includes one of: one, two, four, six, eight, or sixteen.

In one implementation mode, the second determination module includes at least one unit of a group including: a first determination unit, which is configured to determine the subcarrier spacing of 15 kHz and two consecutive OFDM symbols when the frequency band range is less than 6 GHz; and a second determination unit, which is configured to determine the subcarrier spacing of 60 kHz and two or four consecutive OFDM symbols when the frequency band range is greater than 6 GHz.

Another embodiment of the present invention provides a transmission system of a synchronization signal. The system includes a transmitting node and a receiving node. The transmitting node includes: a configuration module, which is configured to determine a frequency band range in which a carrier is located, and configure or assume synchronization channel information on the carrier according to the frequency band range, where the synchronization channel information includes at least one of: a subcarrier spacing or orthogonal frequency division multiplexing (OFDM) symbol information of a synchronization channel; and a transmitting module, which is configured to transmit the synchronization signal using the synchronization channel information. The receiving node includes: a first determination module, which is configured to determine the frequency band range of the carrier; a second determination module, which is configured to determine synchronization channel information according to the frequency band range; and a receiving module, which is configured to receive the synchronization signal on the carrier using the synchronization channel information.

Another embodiment of the present invention further provides a storage medium. The storage medium is configured to store program codes for executing the above-mentioned method for transmitting the synchronization signal.

Another embodiment of the present invention further provides a storage medium. The storage medium is configured to store program codes for executing the above-mentioned method for receiving the synchronization signal.

With the embodiments of the present invention, the transmitting node determines the frequency band range in which the carrier is located, and configures or assumes the synchronization channel information on the carrier according to the frequency band range, where the synchronization channel information includes at least one of: a subcarrier spacing or orthogonal frequency division multiplexing (OFDM) symbol information of a synchronization channel; and the transmitting node transmits the synchronization signal using the synchronization channel information. Since the synchronization signal is transmitted according to the frequency band range of the carrier, and different frequency band ranges correspond to different subcarrier spacings and/or OFDM symbol information, the synchronization precision between the transmitting node and the receiving node may be improved.

Other aspects can be understood after the drawings and detailed description are read and understood.

DETAILED DESCRIPTION

Hereinafter the present invention will be described in detail with reference to the drawings in conjunction with the embodiments. It is to be noted that if not in collision, the embodiments and features therein in the present application may be combined with each other.

It is to be noted that the terms "first", "second" and the like in the specification, claims and drawings of the present application are used to distinguish between similar objects and are not necessarily used to describe a particular order or sequence.

Embodiment 1

Figure 1:
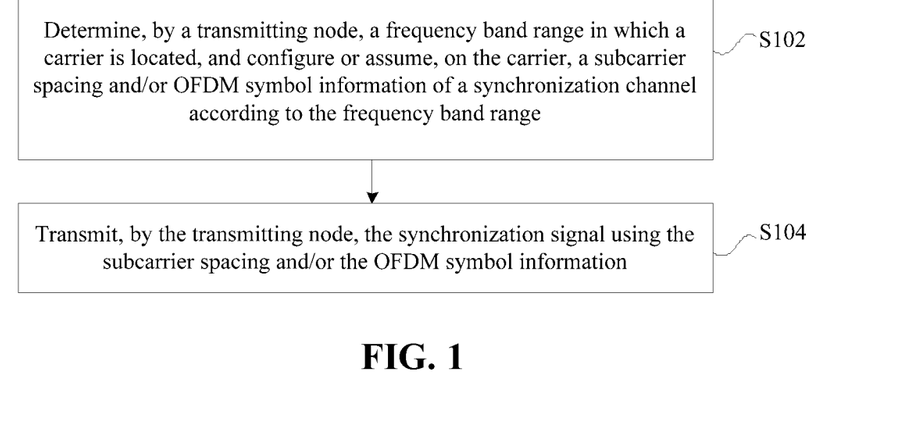
FIG. 1 is a flowchart of a method for transmitting a synchronization signal according to an embodiment of the present invention.

An embodiment provides a method for transmitting a synchronization signal. FIG. 1 is a flowchart of the method for transmitting the synchronization signal according to the embodiment of the present invention. As shown in FIG. 1, the process includes the steps described below.

In step S102, a transmitting node determines a frequency band range in which a carrier is located, and configures or assumes, on the carrier, a subcarrier spacing and/or orthogonal frequency division multiplexing (OFDM) symbol information of a synchronization channel according to the frequency band range. The OFDM symbol information in the embodiment includes: an OFDM position and/or the number of OFDM.

In step S104, the transmitting node transmits the synchronization signal using the subcarrier spacing and/or the OFDM symbol information.

With the above steps, the transmitting node determines the frequency band range in which the carrier is located, and configures, on the carrier, the subcarrier spacing and/or the orthogonal frequency division multiplexing (OFDM) symbol information of the synchronization channel according to the frequency band range; and the transmitting node transmits the synchronization signal using the subcarrier spacing and/or the OFDM symbol information. Since the synchronization signal is transmitted according to the frequency band range of the carrier, and different frequency band ranges correspond to different subcarrier spacings and/or OFDM symbol information, the synchronization precision between the transmitting node and the receiving node may be improved.

In one implementation mode, the transmitting node mentioned in the above steps may be a base station, a terminal, or the like, but is not limited thereto.

In one implementation mode, the subcarrier spacing includes at least one of: 15 kHz, 30 kHz, 60 kHz, 120 kHz, or 240 kHz.

In one implementation mode, the OFDM symbol information includes the number and position of OFDM symbols, and the number of symbols includes at least one of: one, two, four, six, eight, or sixteen.

According to the implementation modes of the embodiment, a plurality of schemes are provided for configuring or assuming the subcarrier spacing and/or the OFDM symbol information of the synchronization channel according to the frequency band range. Examples are included as described below.

When the frequency band range is less than 6 GHz, the subcarrier spacing of 15 kHz and two consecutive OFDM symbols for the synchronization channel are configured or assumed on the carrier.

When the frequency band range is greater than 6 GHz, the subcarrier spacing of 60 kHz and two or four consecutive OFDM symbols for the synchronization channel are configured or assumed on the carrier.

When the frequency band range is between 6 GHz and 30 GHz, the subcarrier spacing of 60 kHz and two or four consecutive OFDM symbols for the synchronization channel are configured or assumed on the carrier.

When the frequency band range is greater than 30 GHz, the subcarrier spacing of 120 kHz and two or four or eight consecutive OFDM symbols for the synchronization channel are configured or assumed on the carrier.

When the frequency band range is greater than 6 GHz, the subcarrier spacing of 120 kHz and two or four or eight consecutive OFDM symbols for the synchronization channel are configured or assumed on the carrier.

In one implementation mode, when the transmitting node transmits the synchronization signal on the carrier according to the frequency range of less than 6 GHz and the sub carrier spacing of 15 kHz, the transmitting node transmits data other than the synchronization signal according to at least one subcarrier spacing of a group including: 15 kHz, 30 kHz, 60 kHz, 120 kHz, and 240 kHz.

In one implementation mode, the step in which the synchronization channel information are configured or assumed on the carrier according to the frequency band range includes that: a subcarrier spacing of a frequency domain resource in an OFDM symbol on which the synchronization channel is located is configured or assumed on the carrier according to the frequency band range. The subcarrier spacing is the same as or different from a subcarrier spacing of a frequency domain resource of a non-synchronization channel in the OFDM symbol on which the synchronization channel is located. When the subcarrier spacing of the frequency domain resource of the synchronization channel is different from the subcarrier spacing of the frequency domain resource of the non-synchronization channel in the OFDM symbol on which the synchronization channel is located, the subcarrier spacing of the frequency domain resource of the synchronization channel is less than the subcarrier spacing of the frequency domain resource of the non-synchronization channel.

In one implementation mode, the step in which the OFDM symbol information of the synchronization channel is configured on the carrier according to the frequency band range includes that: when the frequency band range is greater than 6 GHz or less than 6 GHz, two OFDM symbols are configured for the synchronization channel on the carrier. The two OFDM symbols include one primary synchronization sequence and one secondary synchronization sequence.

In one implementation mode, the step in which the OFDM symbol information of the synchronization channel is configured or assumed on the carrier according to the frequency band range includes that: when the frequency band range is greater than 6 GHz, an OFDM symbol of a primary synchronization sequence and an OFDM symbol of a secondary synchronization sequence are configured or assumed for the synchronization channel on the carrier. The primary synchronization sequence includes at least one or two consecutive OFDM symbols. The secondary synchronization sequence includes at least two consecutive OFDM symbols. The primary synchronization sequence and the secondary synchronization sequence are transmitted or retransmitted on respective OFDM symbols.

In one implementation mode, when the synchronization signal includes a primary synchronization signal and a secondary synchronization signal, the step in which the transmitting node transmits the synchronization signal using the subcarrier spacing and/or the OFDM symbol information includes the steps described below.

The transmitting node transmits the primary synchronization signal through an omnidirectional antenna using the subcarrier spacing and/or the OFDM symbol information. In the embodiment, with the omnidirectional antenna, the signal is transmitted without being precoded using a baseband beam parameter. The radiation range is wide.

The transmitting node transmits the primary synchronization signal through a physical directional antenna using the subcarrier spacing and/or the OFDM symbol information. In the embodiment, with the physical directional antenna, the signal is transmitted after being precoded using a baseband beam parameter to increase signal strength and anti-interference ability.

The transmitting node transmits the secondary synchronization signal using the subcarrier spacing and/or the OFDM symbol information after the signal is precoded using a beam parameter.

The primary synchronization signal is configured to describe a base station and is transmitted and kept the same in each sector of the base station, and the secondary synchronization signal is configured to describe a cell, or describe the cell and a beam (group) at the same time.

In one implementation mode of the embodiment, when three levels of synchronization signals are provided, the first-level synchronization signal is configured to describe the base station, the second-level synchronization signal is configured to describe the sector subordinate to the base station, and the third-level synchronization signal is configured to describe the beam or beam group. The step in which the transmitting node transmits the synchronization signal using the subcarrier spacing and/or the OFDM symbol information includes the steps described below.

The transmitting node transmits the first-level synchronization signal in each sector subordinate to a base station with an omnidirectional antenna using the subcarrier spacing and/or the OFDM symbol information, and the all sectors subordinate to the base station are in synchronization.

The transmitting node transmits the second-level synchronization signal in each sector subordinate to a base station using the subcarrier spacing and/or the OFDM symbol information, and the sectors are out of synchronization.

The transmitting node transmits the third-level synchronization signal in the sectors subordinate to the base station in different directions of beams or beam groups using the subcarrier spacing and/or the OFDM symbol information.

In one implementation mode, the step in which the transmitting node transmits the synchronization signal using the subcarrier spacing and/or the OFDM symbol information includes that: when a bandwidth of the carrier is less than 20 M, the transmitting node transmits a group of synchronization signals using the subcarrier spacing and/or the OFDM symbol information; and when the bandwidth of the carrier is greater than or equal to 40 M, the transmitting node transmits a plurality of groups of synchronization signals discretely in a frequency domain using the subcarrier spacing and/or the OFDM symbol information.

In one implementation mode, the step in which the transmitting node transmits the synchronization signal using the subcarrier spacing and/or the OFDM symbol information includes the steps described below.

In step S11, the transmitting node determines the number S of groups of the synchronization signals by using the following formula:

$S=\lfloor M/K \rfloor$, where $\lfloor \ \rfloor$ represents rounding down, M is a bandwidth of the carrier, and K is a bandwidth corresponding to one group of synchronization signals, and the bandwidth corresponding to the one group of synchronization signals is 20 MHz or 40 MHz.

In step S12, the transmitting node transmits the S groups of synchronization signals according to the spacing bandwidth K.

Further, when the S groups of synchronization signals (which may include synchronization signals at all levels or at several of the all levels) are determined to be transmitted, all groups of synchronization signals are transmitted from a low-frequency end to a high-frequency end or from the high-frequency end to the low-frequency end in the carrier, each group of synchronization signals being configured and transmitted in a central resource located in a respective bandwidth K.

In one implementation mode, each group of the S groups of synchronization signals includes the same first-level synchronization signal and the same or different second-level synchronization signal. Different second-level synchronization signals are the same in sequence while different in a frequency domain and are transmitted by using different beam parameters. The first-level synchronization signal is configured to describe the base station, and the second-level synchronization signal is configured to describe at least one of: a sector, a beam or a beam group. It is to be noted that two levels of synchronization signals are provided here.

In one implementation mode, the step in which the transmitting node transmits the synchronization signal using the subcarrier spacing and/or the OFDM symbol information includes that: the transmitting node transmits one first-level synchronization signal and a plurality of second-level synchronization signals in a frequency domain of the carrier.

In one implementation mode, the step in which the transmitting node transmits the synchronization signal using the subcarrier spacing and/or the OFDM symbol information includes that: the transmitting node transmits the first-level synchronization signal on one OFDM symbol, and transmits the second-level synchronization signal on a plurality of OFDM symbols. The OFDM symbols are consecutive or equally spaced, and each of the OFDM symbols for transmitting the second-level synchronization signal uses a preset beam parameter.

In one implementation mode, a subcarrier spacing used for transmitting the first-level synchronization signal is different from a subcarrier spacing used for transmitting the second-level synchronization signal.

Figure 2:
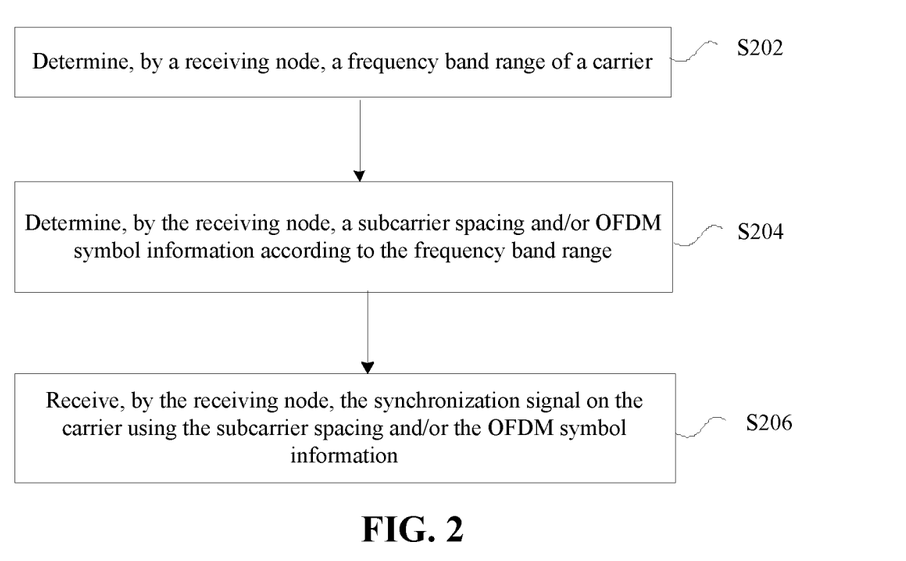
FIG. 2 is a flowchart of a method for receiving the synchronization signal according to an embodiment of the present invention.

An embodiment provides a method for receiving a synchronization signal. FIG. 2 is a flowchart of the method for receiving the synchronization signal according to the embodiment of the present invention. As shown in FIG. 2, the process includes the steps described below.

In step S202, a receiving node determines a frequency band range of a carrier.

In step S204, the receiving node determines a subcarrier spacing and/or OFDM symbol information according to the frequency band range.

In step S206, the receiving node receives the synchronization signal on the carrier using the subcarrier spacing and/or the OFDM symbol information.

In one implementation mode, the receiving node mentioned in the above steps may be a base station, a terminal, or the like, but is not limited thereto.

In one implementation mode, the subcarrier spacing includes one of: 15 kHz, 30 kHz, 60 kHz, 120 kHz, or 240 kHz. The number of OFDM symbols includes one of: one, two, four, six, eight, or sixteen.

In one implementation mode, the step in which the receiving node determines the subcarrier spacing and/or the OFDM symbol information according to the frequency band range may include, but is not limited to the steps described below.

When the frequency band range is less than 6 GHz, the subcarrier spacing of 15 kHz and two consecutive OFDM symbols are determined.

When the frequency band range is greater than 6 GHz, the subcarrier spacing of 60 kHz and two or four consecutive OFDM symbols are determined.

In one implementation mode, the step in which the receiving node receives the synchronization signal on the carrier according to the subcarrier spacing and/or the number of OFDM symbols includes that: when the frequency band range is less than 6 GHz, the receiving node receives the synchronization signal on the carrier according to the subcarrier spacing of 15 kHz, and transmits data other than the synchronization signal according to at least one subcarrier spacing of a group including: 15 kHz, 30 kHz, 60 kHz, 120 kHz, and 240 kHz.

In one implementation mode, the step in which the receiving node receives the synchronization signal on the carrier according to the subcarrier spacing includes that: the receiving node receives the synchronization signal on a frequency domain resource according to the subcarrier spacing.

In one implementation mode, the step in which the receiving node determines the OFDM symbol information according to the frequency band range includes that: when the frequency band range is less than 6 GHz, the receiving node determines two OFDM symbols occupied by the synchronization signal. One OFDM symbol is a primary synchronization sequence and the other OFDM symbol is a secondary synchronization sequence.

In one implementation mode, the step in which the receiving node determines the OFDM symbol information according to the frequency band range includes that: when the frequency band range is greater than 6 GHz, the receiving node determines an OFDM symbol of a primary synchronization sequence and an OFDM symbol of a secondary synchronization sequence for the synchronization channel. The primary synchronization sequence includes at least one or two consecutive OFDM symbols, the secondary synchronization sequence includes at least two consecutive OFDM symbols, and the primary synchronization sequence and the secondary synchronization sequence are transmitted or retransmitted on respective OFDM symbols.

From the description of the implementation modes described above, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solutions provided by the present invention may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the method according to each embodiment of the present invention.

Embodiment 2

An embodiment further provides an apparatus for transmitting a synchronization signal, an apparatus for receiving the synchronization signal, and a transmission system of the synchronization signal for implementing the above-mentioned embodiments and implementation modes. What has been described will not be repeated. As used below, the term "module" may be software, hardware or a combination thereof capable of implementing predetermined functions. The apparatus described below in the embodiment may be implemented by software, but implementation by hardware or by a combination of software and hardware is also possible and conceived.

Figure 3:
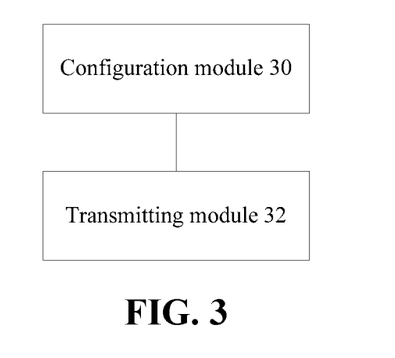
FIG. 3 is a block diagram showing a structure of an apparatus for transmitting a synchronization signal according to an embodiment of the present invention.

FIG. 3 is a block diagram showing a structure of the apparatus for transmitting the synchronization signal according to an embodiment of the present invention. As shown in FIG. 3, the apparatus includes a configuration module 30 and a transmitting module 32.

The configuration module 30 is configured to determine a frequency band range in which a carrier is located, and configure or assume a subcarrier spacing and/or OFDM symbol information on the carrier according to the frequency band range.

The transmitting module 32 is configured to transmit the synchronization signal using the subcarrier spacing and/or the OFDM symbol information.

In one implementation mode, the subcarrier spacing may include, but is not limited to: 15 kHz, 30 kHz, 60 kHz, 120 kHz, and 240 kHz.

In one implementation mode, the OFDM symbol information includes the number of OFDM symbols, and the number of symbols may include, but is not limited to: one, two, four, six, eight, or sixteen.

In one implementation mode, the configuration module 30 includes at least one unit of a group including: a first configuration unit, which is configured to configure or assume the subcarrier spacing of 15 kHz and two consecutive OFDM symbols for the synchronization channel on the carrier when the frequency band range is less than 6 GHz; a second configuration unit, which is configured to configure or assume the subcarrier spacing of 60 kHz and two or four consecutive OFDM symbols for the synchronization channel on the carrier when the frequency band range is greater than 6 GHz; a third configuration unit, which is configured to configure or assume the subcarrier spacing of 60 kHz and two or four consecutive OFDM symbols for the synchronization channel on the carrier when the frequency band range is between 6 GHz and 30 GHz; a fourth configuration unit, which is configured to configure or assume the subcarrier spacing of 120 kHz and two or four or eight consecutive OFDM symbols for the synchronization channel on the carrier when the frequency band range is greater than 30 GHz; and a fifth configuration unit, which is configured to configure or assume the subcarrier spacing of 120 kHz and two or four or eight consecutive OFDM symbols for the synchronization channel on the carrier when the frequency band range is greater than 6 GHz.

Figure 4:
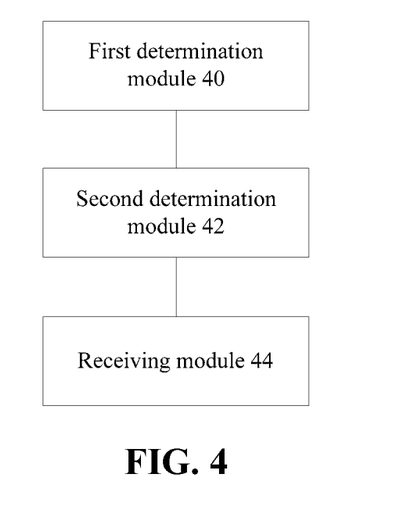
FIG. 4 is a block diagram showing a structure of an apparatus for receiving the synchronization signal according to an embodiment of the present invention.

FIG. 4 is a block diagram showing a structure of an apparatus for receiving the synchronization signal according to an embodiment of the present invention. As shown in FIG. 4, the apparatus includes a first determination module 40, a second determination module 42 and a receiving module 44.

The first determination module 40 is configured to determine a frequency band range of a carrier.

The second determination module 42 is configured to determine a subcarrier spacing and/or OFDM symbol information according to the frequency band range.

The receiving module 44 is configured to receive the synchronization signal on the carrier using the subcarrier spacing and/or OFDM symbol information.

In one implementation mode, the subcarrier spacing may include, but is not limited to: 15 kHz, 30 kHz, 60 kHz, 120 kHz, and 240 kHz.

In one implementation mode, the OFDM symbol information includes the number of OFDM symbols, and the number of OFDM symbols may include, but is not limited to: one, two, four, six, eight, or sixteen.

In one implementation mode, the second determination module includes at least one unit of a group including: a first determination unit, which is configured to determine the subcarrier spacing of 15 kHz and two consecutive OFDM symbols when the frequency band range is less than 6 GHz; and a second determination unit, which is configured to determine the subcarrier spacing of 60 kHz and two or four consecutive OFDM symbols when the frequency band range is greater than 6 GHz.

Figure 5:
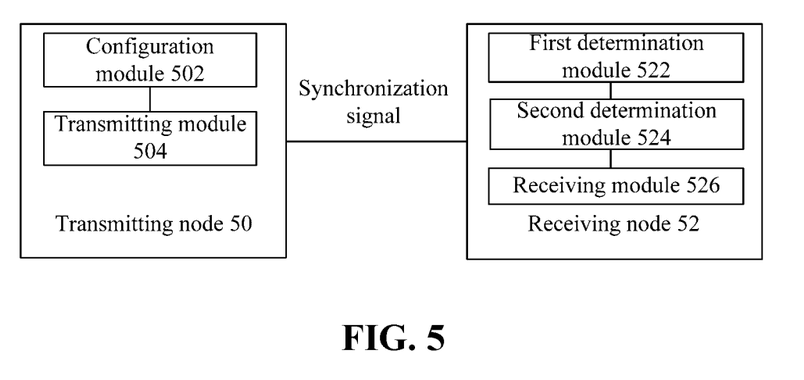
FIG. 5 is a block diagram showing a structure of a transmission system of the synchronization signal according to an embodiment of the present invention.

FIG. 5 is a block diagram showing a transmission system of the synchronization signal according to an embodiment of the present invention. As shown in FIG. 5, the system includes a transmitting node 50 and a receiving node 52. The transmitting node 50 includes a configuration module 502, which is configured to determine a frequency band range in which a carrier is located, and configure or assume a subcarrier spacing and/or OFDM symbol information on the carrier according to the frequency band range; and a transmitting module 504, which is configured to transmit the synchronization signal using the subcarrier spacing and/or the OFDM symbol information.

The receiving node 52 includes: a first determination module 522, which is configured to determine the frequency band range of the carrier; a second determination module 524, which is configured to determine a subcarrier spacing and/or OFDM symbol information according to the frequency band range; and a receiving module 526, which is configured to receive the synchronization signal on the carrier using the subcarrier spacing and/or the number of OFDM symbols.

It is to be noted that the various modules described above may be implemented by software or hardware. Implementation by hardware may, but is not limited to, be performed in the following modes: the various modules described above are located in a same processor, or the various modules described above are located in their respective processors in any combination form.

Embodiment 3

An embodiment relates to a data transmission and control structure on an unlicensed carrier and a shared licensed carrier, and provides a method for performing data transmission and control using the structure. The embodiment includes a plurality of examples for describing the embodiment of the present invention in detail in conjunction with actual scenarios and implementation modes.

Example 1

A transmitting node determines a frequency band in which a carrier is located. When the frequency band is less than or equal to a certain frequency point (for example, 6 GHz), the transmitting node transmits a synchronization signal according to a assumed subcarrier spacing (for example, 15 kHz). When the frequency band is greater than a certain frequency point (for example, 6 GHz), the transmitting node transmits the synchronization signal according to the assumed subcarrier spacing (for example, 60 kHz or 120 kHz).

When the receiving node receives a downlink synchronization signal, the receiving node first determines a frequency band of a carrier to be received. When the frequency band is less than or equal to a certain frequency point (for example, 6 GHz), the receiving node receives and processes the synchronization signal according to the assumed subcarrier spacing (for example, 15 kHz). When the frequency band is greater than a certain frequency point (for example, 6 GHz), the receiving node receives and processes the synchronization signal according to the assumed subcarrier spacing (for example, 60 kHz or 120 kHz).

According to different frequency points of the carrier, the subcarrier spacing of the synchronization signal on the carrier includes one or more of 15 kHz, 30 kHz, 60 kHz, 120 kHz, and 240 kHz. A carrier at a low frequency point may use all the candidate subcarrier spacings, and a carrier at a high frequency point may only use the larger subcarrier spacings to better overcome the interference between the subcarriers at the high frequency point.

Example 2

The transmitting node determines a frequency band in which a carrier is located. When the frequency band is less than or equal to a certain frequency point (for example, 6 GHz), the transmitting node transmits a synchronization signal on assumed OFDM symbols (for example, two assumed symbols, with one for a first-level synchronization signal, i.e., a primary synchronization signal, and the other one for a second-level synchronization signal, i.e., a secondary synchronization signal). When the frequency band is greater than a certain frequency point (for example, 6 GHz), the transmitting node transmits the synchronization signal on assumed OFDM symbols (for example, four assumed symbols, with at least one symbol for the first-level synchronization signal and at least two symbols for the secondary synchronization signal). For example, two symbols are used for the first-level synchronization signals, and the two symbols are retransmitted. Two symbols are used for the second-level synchronization signal, and the two symbols are retransmitted. The symbols actually used for the first-level synchronization signal and the symbols used for the second-level synchronization signal may be flexibly assumed.

When the receiving node receives a downlink synchronization signal, the receiving node first determines a frequency band of a carrier to be received. When the frequency band is less than or equal to a certain frequency point (for example, 6 GHz), the receiving node receives the synchronization signal on the assumed number of OFDM symbols (for example, two assumed symbols, with one for the first-level synchronization signal, i.e., the primary synchronization signal, and the other one for the second-level synchronization signal, i.e., the secondary synchronization signal). When the frequency band is greater than a certain frequency point (for example, 6 GHz), the receiving node receives the synchronization signal on the assumed number of OFDM symbols (for example, four OFDM symbols).

As the synchronization signals use different subcarrier spacings, the candidate number of OFDM symbols for the synchronization signal includes one or more of one, two, four, six, eight, and sixteen.

Example 3

Based on the example 2, when the frequency point of the carrier is higher (for example, the frequency band is 30 GHz or 60 GHz), the transmitting node may transmit the synchronization signal using a larger subcarrier spacing (a subcarrier spacing greater than 60 kHz, for example, a subcarrier spacing of 120 kHz). At this time, the number of symbols for the synchronization signal is sixteen. At least one symbol is used for the first-level synchronization signal (generally without using a beam parameter), and the second-level synchronization signal uses at most the remaining symbols. It is also conceivable that two symbols are used for the first-level synchronization signal and are retransmitted with respect to each other. Two symbols are also used for the second-level synchronization signal and are retransmitted with respect to each other. The remaining symbols continue to be used for the second-level synchronization signals. At this time, a plurality of second-level synchronization signals is transmitted, and may be transmitted using different beam (direction) parameters (e.g., baseband beam parameters). Regardless of the method used for transmission, the corresponding symbol positions (positions which may also be understood as the number, because the total number of all positions is the number), and/or corresponding beam parameters for transmission are assumed in advance, so that the receiving node receives the signal at the assumed symbol positions (or according to the assumed beam parameters).

At this time, the coverage of the high frequency point is poor, so it is conceivable to increase the coverage of the synchronization signal by retransmitting consecutive symbols.

The receiving node receives the transmitted synchronization signal in a assumed manner according to the frequency point of the receiving carrier.

Example 4

Based on the examples 1, 2, and 3, the transmitting node determines a subcarrier spacing and a symbol position for transmitting a synchronization signal, and then also performs transmission of a non-synchronization signal in the manner described below.

On the symbol for transmitting the synchronization signal, the transmitting node transmits the frequency domain position of the synchronization signal by using the subcarrier spacing obtained in the foregoing manner. For the frequency domain resource of the frequency domain position of the non-synchronization signal on the symbol, the transmission of data other than the synchronization signal may be performed using a subcarrier spacing different from the subcarrier spacing of the synchronization signal.

In one manner, for the first-level synchronization signal, the beam parameter is not used for transmission, so cell-level system information or broadcast type information may be transmitted on other frequency domain resources of the symbols of the first-level synchronization signal. A cell-level reference signal may also be transmitted for measurement of reference signal receiving power (RSRP). User data is also allowed to be transmitted. If a non-synchronization signal at a lower level is transmitted, a subcarrier spacing used is less than or equal to the subcarrier spacing used for the synchronization signal. For the second-level synchronization signal (or the synchronization signal transmitted by using the beam parameter), system information at a beam level or the broadcast type information may be transmitted on other frequency domain resources of the symbols on which the second-level synchronization signal is located. A beam-level reference signal may also be transmitted for measurement of the RSRP. If a beam-level non-synchronization signal is transmitted, a subcarrier spacing used is less than or equal to the subcarrier spacing used by the synchronization signal (the second-level synchronization signal or the synchronization signal transmitted using the beam parameter).

Example 5

When a transmitting node transmits a synchronization signal, the transmission is performed according to a level of the synchronization signal.

If the synchronization signal is divided into two levels, a first-level synchronization signal (i.e., primary synchronization signal) does not use a beam parameter (i.e., the synchronization signal is not precoded using the baseband beam parameter). A second-level synchronization signal (i.e., secondary synchronization signal) is transmitted using the beam parameter. If the first-level synchronization signal is repeatedly transmitted multiple times on adjacent symbols, a first-level synchronization signal on the first symbol has a cyclic prefix (CP), and first-level synchronization signals on subsequent symbols do not have the CP. When the second-level synchronization signal is transmitted, if the transmission is repeated on the adjacent symbols, a second-level synchronization signal on the first symbol has a cyclic prefix, and the second-level synchronization signal on each subsequent symbol carries the CP which is the same as the CP on the first symbol.

If the synchronization signal is divided into three levels (i.e., a first-level synchronization signal, a second-level synchronization signal, and a third-level synchronization signal), the first-level and second-level signals jointly complete an indication of a cell, and the third-level signal completes an indication of a beam or a beam group. At this time, it may be considered that the first-level and second-level signals are not transmitted by using the beam parameter, and the third-level signal is transmitted by using the beam parameter.

In the case of two levels, in one transmission period of the synchronization signal, the transmitting node may transmit the first-level synchronization signal only once, and transmit the second-level synchronization signal on a plurality of symbols. The plurality of symbols may be consecutive or equally spaced. The second-level synchronization signal is transmitted on each symbol among the plurality of symbols by using a predetermined beam parameter.

In the case of two levels, the transmitting node may transmit the first-level and second-level synchronization signals according to different subcarrier spacings. In the case of three levels, the transmitting node may transmit the first-level and second-level synchronization signals according to the same subcarrier spacing, and the third-level synchronization signal according to a subcarrier spacing different from the subcarrier spacing used for the first-level and second-level synchronization signals.

Example 6

The transmitting node determines the number of synchronization signals transmitted in a frequency domain according to a carrier bandwidth.

When the transmitting node determines that the bandwidth of the carrier is less than a certain bandwidth value (for example, 20 M), the transmitting node transmits one group of synchronization signals over the frequency domain of the carrier. When the bandwidth of the carrier is greater than or equal to a certain value (for example, 40 M), the transmitting node transmits a plurality of groups of synchronization signals over the frequency domain of the carrier.

The transmitting node determines the number S of groups of the synchronization signals by using the following formula: $S=\lfloor M/K \rfloor$. $\lfloor \; \rfloor$ represents rounding down, M is the bandwidth of the carrier, and K is a bandwidth corresponding to one group of synchronization signals, or K is a spacing bandwidth between a plurality of synchronization signals, for example 20 MHz or 40 MHz.

The transmitting node determines that, on a same carrier, each group of synchronization signals includes a same first-level synchronization signal and a same or different second-level synchronization signal. Different second-level synchronization signals are same in sequence while different in a frequency domain and are transmitted by using different beam parameters.

Example 7

Based on the example 6, here only one group of the first-level synchronization signals is transmitted in the frequency domain of the carrier, while the second-level synchronization signal is still transmitted as processed in accordance with the second-level synchronization signal in the example 6.

Further, if the synchronization signal is divided into three levels, the first level and the second level are processed in accordance with the first-level synchronization signal in the example 6 or the example 7, and the third level is processed in accordance with the second-level synchronization signal in the example 6.

With the method for transmitting the synchronization signal of the present application, the synchronization precision between the transmitting node and the receiving node may be improved.

Embodiment 4

An embodiment of the present invention further provides a storage medium. In the embodiment, the storage medium may be configured to store program codes for executing the steps described below.

In step S1, a transmitting node determines a frequency band range in which a carrier is located, and configures or assumes a subcarrier spacing and/or OFDM symbol information on the carrier according to the frequency band range.

In step S2, the transmitting node transmits the synchronization signal using the subcarrier spacing and/or the OFDM symbol information.

In the embodiment, the storage medium may include, but is not limited to, a USB flash disk, a read-only memory (ROM), a random access memory (RAM), a mobile hard disk, a magnetic disk, an optical disk or another medium capable of storing program codes.

In one implementation mode of the embodiment, according to the program codes stored in the storage medium, a processor performs a step in which the transmitting node determines the frequency band range in which the carrier is located, and configures or assumes the subcarrier spacing and/or the OFDM symbol information on the carrier according to the frequency band range.

In one implementation mode of the embodiment, according to the program codes stored in the storage medium, a processor performs a step in which the transmitting node transmits the synchronization signal using the subcarrier spacing and/or the OFDM symbol information.

For examples in the embodiment, reference may be made to the examples described in the above embodiments and implementation modes, and the examples will not be repeated in the embodiment.

An embodiment of the present invention further provides a storage medium. In the embodiment, the storage medium may be configured to store program codes for executing the steps described below.

In step S1, a receiving node determines a frequency band range of a carrier.

In step S2, the receiving node determines a subcarrier spacing and/or OFDM symbol information according to the frequency band range.

In step S3, the receiving node receives the synchronization signal on the carrier using the subcarrier spacing and/or the OFDM symbol information.

In the embodiment, the storage medium may include, but is not limited to, a USB flash disk, a read-only memory (ROM), a random access memory (RAM), a mobile hard disk, a magnetic disk, an optical disk or another medium capable of storing program codes.

For examples in the embodiment, reference may be made to the examples described in the above embodiments and implementation modes, and the examples will not be repeated in the embodiment.

Each of the above-mentioned modules or steps of the present invention may be implemented by a universal computing apparatus, they may be concentrated on a single computing apparatus or distributed on a network formed by multiple computing apparatuses, and they may be implemented by program codes executable by the computing apparatuses, so that they may be stored in a storage apparatus for execution by the computing apparatuses, and in some circumstances, the illustrated or described steps may be executed in sequences different from those described herein, or they may be made into various integrated circuit modules separately, or multiple modules or steps therein may be made into a single integrated circuit module for implementation. In this way, the embodiments of the present invention are not limited to any specific combination of hardware and software. The above are only the embodiments of the present invention and are not intended to limit the present application, and for those skilled in the art, the present application may have various modifications and variations. Any modifications, equivalent substitutions, improvements and the like made within the spirit and principle of the present application should fall within the scope of the present application.

INDUSTRIAL APPLICABILITY

With the embodiments of the present invention, the transmitting node determines the frequency band range in which the carrier is located, and configures or assumes the synchronization channel information on the carrier according to the frequency band range, where the synchronization channel information includes at least one of: a subcarrier spacing or orthogonal frequency division multiplexing (OFDM) symbol information of a synchronization channel; and the transmitting node transmits the synchronization signal using the synchronization channel information. Since the synchronization signal is transmitted according to the frequency band range of the carrier, and different frequency band ranges correspond to different synchronization channel information, the synchronization precision between the transmitting node and the receiving node may be improved.

What is claimed is:

1. A method for generating a synchronization channel, comprising:
   determining, by a transmitting node, a frequency band range for a carrier;
   configuring a synchronization channel information on the carrier according to the frequency band range, wherein the synchronization channel information comprises:
   a subcarrier spacing of the synchronization channel, and
   an orthogonal frequency division multiplexing (OFDM) symbol information of the synchronization channel; and
   transmitting, by the transmitting node, the synchronization channel using the synchronization channel information, wherein the configuring the synchronization channel information on the carrier according to the frequency band range comprises:
   configuring, on the carrier, the subcarrier spacing of a frequency domain resource in an OFDM symbol on which the synchronization channel is located according to the frequency band range, wherein the subcarrier spacing is different from a subcarrier spacing of a frequency domain resource of a non-synchronization channel in the OFDM symbol on which the synchronization channel is located.

2. The method of claim 1, wherein the subcarrier spacing comprises at least one of: 15 kHz, 30 kHz, 120 kHz, or 240 kHz.

3. The method of claim 1, wherein the OFDM symbol information comprises a quantity of OFDM symbols, and wherein the quantity of OFDM symbols is four.

4. The method of claim 1, wherein the configuring the synchronization channel information on the carrier according to the frequency band range comprises one of:
in response to the frequency band range being less than a frequency, configuring the subcarrier spacing of 15 kHz or 30 kHz; or
in response to the frequency band range being greater than the frequency, configuring the subcarrier spacing of 240 kHz or 120 kHz.

5. The method of claim 4, wherein the frequency is 6 GHz.

6. The method of claim 4, wherein when the transmitting node transmits the synchronization channel on the carrier according to the frequency band range of less than a frequency and the subcarrier spacing comprises 15 kHz, the method further comprising:
transmitting, by the transmitting node, data other than the synchronization channel using another subcarrier spacing, wherein the other subcarrier spacing comprises one of: 15 kHz, 30 kHz, or 60 kHz.

7. The method of claim 1, further comprising:
transmitting, by the transmitting node, data other than the synchronization channel using a first subcarrier spacing, wherein the first subcarrier spacing is less than or equal to the sub carrier spacing used to transmit the synchronization channel.

8. An apparatus comprising a processor configured to perform operations comprising:
determining, by a transmitting node, a frequency band range for a carrier;
configuring a synchronization channel information on the carrier according to the frequency band range, wherein the synchronization channel information comprises:
a subcarrier spacing of a synchronization channel, and
an orthogonal frequency division multiplexing (OFDM) symbol information of the synchronization channel; and
transmitting, by the transmitting node, the synchronization channel using the synchronization channel information, wherein the configuring the synchronization channel information on the carrier according to the frequency band range comprises:
configuring, on the carrier, the subcarrier spacing of a frequency domain resource in an OFDM symbol on which the synchronization channel is located according to the frequency band range, wherein the subcarrier spacing is different from a subcarrier spacing of a frequency domain resource of a non-synchronization channel in the OFDM symbol on which the synchronization channel is located, and wherein the determining and the transmitting generate the synchronization channel.

9. The apparatus of claim 8, wherein the subcarrier spacing comprises at least one of: 15 kHz, 30 kHz, 120 kHz, or 240 kHz.

10. The apparatus of claim 8, wherein the OFDM symbol information comprises a quantity of OFDM symbols, and wherein the quantity of OFDM symbols is four.

11. A method for generating a synchronization channel, comprising:
determining, by a transmitting node, a frequency band range for a carrier;
configuring a synchronization channel information on the carrier according to the frequency band range, wherein the synchronization channel information comprises:
a subcarrier spacing of the synchronization channel, and
an orthogonal frequency division multiplexing (OFDM) symbol information of the synchronization channel; and
transmitting, by the transmitting node, the synchronization channel using the synchronization channel information, wherein the configuring the synchronization channel information on the carrier according to the frequency band range comprises:
configuring, on the carrier, the subcarrier spacing of a frequency domain resource in an OFDM symbol on which the synchronization channel is located according to the frequency band range, wherein the subcarrier spacing is the same as a subcarrier spacing of a frequency domain resource of a non-synchronization channel in the OFDM symbol on which the synchronization channel is located.

12. The method of claim 11, wherein the subcarrier spacing comprises at least one of: 15 kHz, 30 kHz, 120 kHz, or 240 kHz.

13. The method of claim 11, wherein the OFDM symbol information comprises a quantity of OFDM symbols, and wherein the quantity of OFDM symbols is four.

14. The method of claim 11, wherein the configuring the synchronization channel information on the carrier according to the frequency band range comprises one of:
in response to the frequency band range being less than a frequency, configuring the subcarrier spacing of 15 kHz or 30 kHz; or
in response to the frequency band range being greater than the frequency, configuring the subcarrier spacing of 240 kHz or 120 kHz.

* * * * *